Patented Nov. 23, 1948 2,454,755

UNITED STATES PATENT OFFICE 2,454,755

PRODUCTION OF TOXINS AND TOXOIDS

Ivan A. Parfentjev, Nyack, and Alfred J. Weil, Pearl River, N. Y., assignors, by mesne assignments, to American Cyanamid Company, New York, N. Y., a corporation of Maine No Drawing. Application February 7, 1945, Serial No. 576,704

6 Claims. (Cl. 167—78)

1

This invention relates to the production of antigenic toxoids for the prevention of various diseases and is more particularly concerned with such toxoids as are relatively free of bacterial antigens.

It has been well known that bacterial-free filtrates of broth cultures of organisms such as Staphylococcus, *Cl. tetani*, *C. diphtheriae*, and the like, contain, in addition to soluble exotoxins, bacterial substances which are antigenic but which are different from the toxins. The presence of these bacterial antigenic substances can be demonstrated by a flocculation reaction with the corresponding anti-bacterial serum which has no ability to neutralize the toxin.

The presence of the bacterial antigen in toxin solutions is specifically indicated by phenomena occurring in the testing for immunity and immunization of individuals against the disease diphtheria. In the Schick test, a small amount of diphtheria toxin is introduced into the skin of the individual to be tested and absence of any reaction to this toxin in that individual indicates immunity and the lack of necessity for immunization with toxoid. If a reaction to the injected toxin occurs, it may or may not be due to the direct action of the toxin on non-immunized tissues. A Shick control is then carried out by injecting in the same individual, in another location, diphtheria toxin which has been heated at a sufficient temperature and for a sufficient time to destroy toxin action. If this Schick control also produces a reaction, the reaction is presumed to be due to the presence of bacterial antigen in the toxin, and to the presence in the individual tested of anti-bodies capable of reacting with this bacterial antigen. Individuals having this positive reaction with the Shick control are further tested by the withdrawal of blood serum and this blood serum is tested directly for the presence of diphtheria antitoxin. It has been found that many of these individuals showing an absence of diphtheria antitoxin, have acquired antibodies capable of reacting with the bacterial antigen without having acquired antibodies capable of neutralizing diphtheria toxin.

One difficulty occurring with the use of toxoids may be seen in the severe reactions to the injections of such toxoids. With diphtheria toxoid, this frequently appears when individuals over the age of twelve years are injected with alum-precipitated diphtheria toxoid. Since toxoid is the toxin which has been treated to destroy all specific toxin action but to retain the specific antigen action of the toxin, such toxoid still contains the bacterial antigen which, as is seen with the Schick control test, can still produce an antigen antibody reaction (bacterial allergy). In the case of alum-precipitated diphtheria toxoid, this objectionable

2 reaction is so frequent and so severe in individuals over the age of twelve that it is generally inadvisable to use this superior immunizing agent at all in individuals over that age. Similar phenomena are seen in the severe reactions which frequently accompany the administration of strong dilutions of staphylococcus toxoid. The inconstant presence of this reaction makes it quite obvious that the reaction produced is not due to some inherent toxic property of the toxoid but is rather due to some acquired bacterial allergy of the individual injected.

Several methods have been described for the separation of bacterial toxin from the other components of broth filtrates. Generally, these methods have been applied for the purpose of attempting to separate out relatively pure toxin for purposes of chemical examination. The well-known salting-out process has frequently been used in this connection. Likewise, the process of adsorption has been used, as illustrated by the addition of alum to toxoids. These several methods have not been commercially successful to produce toxoids or toxins free from bacterial antigens. Thus, with the addition of alum to a solution of diphtheria toxin, the bacterial antigen as well as the toxin is adsorbed on the precipitated aluminum hydroxide and in definition no differential separation is obtained. In other cases, the poor antigenic qualities of the materials obtained are such as to negative possible use of them for immunization.

In some cases magnesium hydroxide has been used for the purification of toxins by the addition of the hydroxide to the toxin solution. In such cases, the comparatively large amounts of magnesium hydroxide added to the solution absorbed substantially all of the toxin so that the supernatant fluid was substantially entirely devoid of toxin. The toxin was then eluted from the magnesium hydroxide and, while the eluate contained toxin in a form which still gave in vitro reaction with the corresponding antitoxin, the toxin was so greatly damaged by the treatment that it had lost the essential biological function of evoking immunity in experimental animals.

It is one of the objects of this invention to selectively separate component parts of bacterial filtrates.

It is a further object to remove bacterial antigens from toxin solutions without significantly damaging or removing antigenic toxins from such solutions.

These and further objects are attained by selectively adsorbing bacterial antigens from toxin-containing filtrates by the use of particulate suspensions of an insoluble magnesium compound as the adsorbent material. By the term insoluble magnesium compound we mean those compounds of magnesium which have a solubility in water of less than about 5%. Such insoluble magnesium compounds include magnesium hydroxide, magnesium lactate, magnesium phosphate, magnesium pyrophosphate, magnesium carbonate, magnesium silicate and the like.

The term "bacterial antigen," as used herein, designates such antigen as can be labelled by its reactivity with anti-bacterial sera obtained by immunization with bacteria which agglutinate these micro-organisms specifically; or, in other words, such antigens as are detectable by precipitation with homologous anti-bacterial sera. The term "toxin" is used herein to mean a specific substance which, in addition to its demonstrable toxic action on animal tissues, is capable of stimulating in an animal, the production of a corresponding antibody, e. g., antitoxin, which specifically neutralizes the toxic action of the toxin. The word "toxin" is specifically differentiated from the common pharmacological use of the term which is applied broadly to substances having toxic action, whether or not they be specific antigens.

The following, in which proportions are by weight, are specific examples of methods for carrying out our process, the invention not being limited to the specific details set forth.

*Example 1*

A magnesium hydroxide suspension is prepared by adding ammonium hydroxide to an aqueous solution containing 37% magnesium sulphate, until all of the magnesium is precipitated as magnesium hydroxide. The precipitated material is removed by filtration and is then washed with water until substantially no sulphate ion can be detected in the wash liquid. With the completely washed magnesium hydroxide, a suspension is made which contains about 12% of the magnesium hydroxide. This suspension is then mixed with a diphtheric toxin solution in an amount of the magnesium hydroxide suspension equivalent to 10–25% of the mixture. After standing, with stirring, for several hours (about 4–8), the magnesium hydroxide particles are separated from the solution by filtration or centrifugation. It will be found that the magnesium hydroxide has adsorbed the bacterial antigens which, by this procedure, are removed from the toxin solution. If the toxin solution, after being so treated, is tested for its flocculative reaction with homologous anti-bacterial serium, it can be shown, by the absence of flocculation, that the substances in the original toxin solution capable of reacting with this homologous anti-bacterial serum have been substantially entirely removed.

Adjustments can be made in preliminary tests to indicate the optimum amount of magnesium hydroxide which will give, in the final toxin, the maximum amount of toxin with the minimum amount of bacterial antigens. This will generally be in the range of about 1–5% by weight of solid magnesium hydroxide, on a dry basis.

*Example 2*

To one liter of standard diphtheria toxin at a pH of 9 containing bacterial antigens was added 200 grams of magnesium lactate $$(Mg(C_3H_5O_3)_2.3H_2O)$$

The mixture was then stirred at 4° C. for twenty-four hours at the end of which period the material was filtered and the filtrate adjusted to a pH of 8.5 by the addition of normal hydrochloric acid. The toxin in the filtrate was converted to the corresponding toxoid by addition of 0.3% formalin and incubation for three weeks at 37° C. The toxoid was then dialized for one day in a Cellophane bag submerged in running water.

Subsequent study of the filtrate showed that it contained most of the toxin in substantially undiminished potency. Examination of the insoluble magnesium lactate showed that it had adsorbed most of the bacterial antigens present in the original toxin solution but had adsorbed very little of the toxin.

As when using magnesium hydroxide as the adsorbing agent for the bacterial antigens, the optimum amount of the magnesium salt may be found by preliminary tests. The amount to be used of a particular insoluble magnesium salt will vary according to its molecular weight. For example, magnesium lactate has a molecular weight of 256.4 and more of this particular salt will be required, on a weight basis, than magnesium hydroxide which has a molecular weight of only 58.3. However, when calculated on an equivalent basis expressed in terms of magnesium hydroxide, the amount of magnesium lactate or other insoluble magnesium salt used will be within the range 1 to 5% by weight expressed as magnesium hydroxide.

Further evidence of the selective removal of these bacterial antigens from the toxin can be shown by suitable treatment of the insoluble magnesium compound particles removed from the solution after the adsorption step, as described, by filtration or centrifugation. The separated particles of magnesium hydroxide, magnesium lactate, or other insoluble magnesium salt can be re-suspended in a small amount of water and to this suspension is added a suitable acid, e. g., hydrochloric acid, until the neutral point is reached, resulting in the conversion of the insoluble magnesium salt to a soluble salt. This process of elution frees the adsorbed bacterial antigen into the solution. The soluble salts are then removed from the solution by dialysis with a suitable membrane and water. After the dializable salts are removed, the residual solution will be found, by suitable tests, to contain only a very small amount of toxin and a large amount of bacterial antigen.

The relatively toxin-free bacterial antigens, although slightly altered by such denaturation as may take place in the process of freeing it from the insoluble magnesium compound, may be shown to have certain definite values. These bacterial antigens may be used to detect by skin test or other appropriate means, the presence of bacterial allergy or specific antibodies. The present method furnishes a simplified procedure for selective separation of bacterial antigen from culture filtrates and is operative whether or not the filtrates contain significant amounts of toxin.

The bacterial antigen-free diphtheria toxin prepared as above described can be converted to a toxoid in the usual method by the addition of appropriate amounts of formalin. The toxoid can be further treated by the addition of alum to produce a diphtheria toxoid with antigenic properties comparable to diphtheria toxoid prepared in the same fashion with toxin from which the bacterial antigens have not been removed. This bacterial antigen-free toxoid is demonstrably superior to toxoids which contain bacterial antigen because of the considerably lessened reactions accompanying injections of the former into animals and human beings. In fact, it would appear that the toxoids prepared in accordance with the present invention are enhanced in antigenic properties by virtue of the fact that there is eliminated the danger to surrounding tissue which results when reactions take place due to the presence of bacterial antigens.

A still further demonstration of the utility of the product prepared in accordance with the present invention can be seen from the fact that a bacterial antigen-free diphtheria toxin suitably diluted may be used to perform the well-known Schick test. With this purified toxin, there may be avoided the pseudo Schick reactions that result from the undesirable associated proteins usually present in diphtheria toxin solutions.

As has been described, the bacterial antigen-free toxin solution, after treatment with magnesium hydroxide or other insoluble magnesium salt, may be detoxified and converted to toxoid with formalin or the like. However, the toxin in solution may be further refined prior to detoxification by treatment with a suspension of calcium phosphate. More specifically, there is added to the toxin solution, after the insoluble magnesium salt treatment, a suspension of tricalcium phosphate in water in the proportion of about 8 to 20% of the total volume. The tricalcium phosphate suspension contains about 3 to 5% very finely divided solid calcium phosphate. The entire mixture is then stirred for about 24 hours at room temperature and the calcium phosphate is filtered from the solution. It will be found that the calcium phosphate will have adsorbed the toxin, which is thereby selectively separated from inert nitrogenous substances which remain in solution. The toxin adsorbed on the calcium phosphate may be removed therefrom by leaching or by other suitable treatment. The refined toxin may be detoxified as previously described.

Toxoid, prepared from the bacterial antigen-free toxin solution may be, itself, adsorbed by calcium phosphate in suspension by treating the solution containing the toxoid with a suspension of tricalcium phosphate as described above. The specific antigen of toxoid is adsorbed on the calcium phosphate and the calcium phosphate adsorbate of toxoid is removed from the solution by filtration or the like, whereby the toxoid is selectively separated from inert nitrogenous substances which remain in solution. The calcium phosphate adsorbate of toxoid may be re-suspended and used as such for immunization. This material is superior to alum-precipitated toxoids sometimes used, since the latter contain more mineral bulk than the phosphate adsorbate suspension. The phosphate adsorption removes substantially all of the toxoid from the solution without any loss of antigenic properties. The toxoid, as well as the toxin, is more readily adsorbed on the calcium phosphate if the toxin solution has been treated with the insoluble magnesium compound to remove bacterial antigens, than is the case with toxoid or toxins in which the toxin solution has not been treated with the magnesium compound.

As has been described, bacterial antigens are selectively separated from toxins by the use of suspensions of relatively small amounts of insoluble magnesium salts, including magnesium hydroxide. In place of the latter material, we may use particulate suspensions of calcium hydroxide, strontium hydroxide, calcium sulphate, or the like, the suspensions of such substances, alone or in admixture with each other or with insoluble magnesium salts, being adjusted as to concentration and particle size such that the adsorptive characteristics of the material will give the desired effect with respect to the selective separation. The alternative substances will generally be useful in about the same amounts as has been described for the insoluble magnesium compounds.

While the invention has been specifically described in connection with diphtheric toxin and toxoid, similar selective adsorption with corresponding results may be carried out with staphylococcal, tetanal, and perfringens toxin and toxoid, and the like.

The usefulness of the product of the present invention may be further demonstrated by the production of antitoxins free of unspecific zone flocculation phenomena. For example, bacterial antigen-free tetanus toxin prepared in accordance with the present method may be converted to a toxoid, and the toxoid used to immunize a suitable animal such as a horse. There is produced in the animal an antitoxin which contains a minimal amount of antibodies against bacterial antigens. Such an antitoxin is useful in the Ramon flocculative reaction to determine the potency of tetanus toxin. Bacterial antigen-free tetanus toxin is also useful in the Ramon flocculative reaction to determine the potency of tetanus antitoxin. By the use of these materials, both tests for potency are relatively free of the confusing zone phenomenon. When the Ramon flocculative reaction is carried out with bacterial antigen-free toxin and the corresponding anti-bacterial serum to detect the presence of residual amounts of bacterial antigen, an occasional slight reaction may be observed. However, when this bacterial antigen-free toxin is first converted to a toxoid and is then again brought into contact with the homologous anti-bacterial serum, it will be noted that even these slight flocculative reactions no longer occur.

It will be obvious that other suitable changes may be made in carrying out the invention without departing from the spirit and scope thereof as defined in the appended claims.

This is a continuation-in-part of our copending application, Serial No. 439,104, filed April 15, 1942, now abandoned.

We claim:

1. The process of separating bacterial antigens from toxins of the group consisting of diphtheria, tetanus, staphylococus, and perfringens which comprises mixing a bacterial filtrate containing one of said toxins and bacterial antigens in solution with an aqueous suspension of magnesium hydroxide in an amount equivalent to about 1 to 5% by weight of dry magnesium hydroxide, agitating the mixture, whereby the magnesium hydroxide selectively adsorbs bacterial antigens present in the solution without substantial adsorption and alteration of the toxin, and separating the magnesium hydroxide with the adsorbed bacterial antigens from the toxin solution.

2. The process which comprises mixing a bacterial filtrate containing diphtheria toxin and bacterial antigens in solution with an aqueous suspension of magnesium hydroxide in an amount equivalent to about 1 to 5% by weight of dry magnesium hydroxide, agitating the mixture, whereby the magnesium hydroxide selectively adsorbs bacterial antigens present in the solution without substantial adsorption and alteration of the toxin, separating the magnesium hydroxide with the adsorbed bacterial antigens from the toxin solution, converting the toxin in the last-mentioned solution into toxoid, and adsorbing the toxoid on an adsorbent selected from the group consisting of aluminum hydroxide and tricalcium phosphate.

3. The process of separating bacterial antigens from toxin which comprises mixing a bacterial filtrate containing a toxin of the group consisting of diphtheria, tetanus, staphylococus, and perfringens toxins and bacterial antigens in solution with an aqueous suspension of an insoluble magnesium compound in an amount equivalent to about 1 to 5% by weight of dry magnesium hydroxide, agitating the mixture, whereby the insoluble magnesium compound selectively adsorbs bacterial antigens present in the solution without substantial adsorption and alteration of the toxin, and separating the insoluble magnesium compound with the adsorbed bacterial antigens from the toxin solution.

4. The process which comprises mixing a bacterial filtrate containing diphtheria toxin and bacterial antigens in solution with an aqueous suspension of an insoluble magnesium compound in an amount equivalent to about 1 to 5% by weight of dry magnesium hydroxide, agitating the mixture, whereby the insoluble magnesium compound selectively adsorbs bacterial antigens present in the solution without substantial adsorption and alteration of the toxin, separating the insoluble magnesium compound with the adsorbed bacterial antigens from the toxin solution and converting the toxin in the last-mentioned solution into toxoid.

5. The process which comprises mixing a bacterial filtrate containing a toxin of the group consisting of diphtheria, tetanus, staphylococus, and perfringens toxins and bacterial antigens in solution with an aqueous suspension of an insoluble magnesium compound in an amount equivalent to about 1 to 5% by weight of dry magnesium hydroxide, agitating the mixture, whereby the insoluble magnesium compound selectively adsorbs bacterial antigens present in the solution without substantial adsorption and alteration of the toxin, separating the insoluble magnesium compound with the adsorbed bacterial antigens from the toxin solution, converting the toxin in the last-mentioned solution into toxoid, and adsorbing the toxoid on an adsorbent selected from the group consisting of aluminum hydroxide and tricalcium phosphate.

6. The process which comprises mixing a bacterial filtrate containing a toxin of the group consisting of diphtheria, tetanus, staphylococus, and perfringens toxins and bacterial antigens in solution with an aqueous suspension of magnesium lactate in an amount equivalent to about 1 to 5% by weight of dry magnesium hydroxide, agitating the mixture, whereby the magnesium lactate selectively adsorbs bacterial antigens present in the solution without substantial adsorption and alteration of the toxin, and separating the magnesium lactate with the adsorbed bacterial antigens from the toxin solution.

IVAN A. PARFENTJEV.
ALFRED J. WEIL.

REFERENCES CITED

The following references are of record in the file of this patent:

UNITED STATES PATENTS

| Number | Name | Date |
|---|---|---|
| 2,175,090 | Parfentjev | Oct. 3, 1939 |

FOREIGN PATENTS

| Number | Country | Date |
|---|---|---|
| 543,604 | Germany | Feb. 8, 1932 |
| 2,235 | Great Britain | 1894 |

OTHER REFERENCES

J. Immunology, 22, 1932, pages 61 to 66, article by Ecker et al., photostat in 167/78 T.

J. Infectious Diseases 57, 1935, pages 164 to 168, article by Dick et al.